United States Patent Office 2,802,031
Patented Aug. 6, 1957

2,802,031

UNSYMMETRICAL DIMETHYLHYDRAZINE

David Horvitz, Kent Village, Md., assignor to Metalectro Corporation, Laurel, Md., a corporation of Delaware No Drawing. Application July 19, 1954,
Serial No. 444,397

20 Claims. (Cl. 260—583)

This invention relates to unsymmetrical dimethyl hydrazine and to methods of manufacture thereof particularly by simplified, readily-controlled and economical processes giving high yields.

One of the known methods for the manufacture of unsymmetrical dimethylhydrazine involves the preparation of N-nitrosodimethylamine by the reaction of dimethylamine and sodium nitrite in the presence of an acid. The N-nitrosodimethylamine is then reduced to unsymmetrical dimethylhydrazine by the reaction of zinc dust in acetic acid solution. Heretofore, this reduction process has required large excess of zinc dust over the theoretical amount, as well as greater quantities of acetic acid than theoretically required for a complete reaction with zinc to effect the reduction. Although the resulting product is obtained in fairly good yields in these cases, the required materials are expensive.

Furthermore, the methods which are prescribed in the prior art for the separation and isolation of the N-nitrosodimethylamine, as well as the unsymmetrical dimethylhydrazine are also costly. The isolation of N-nitrosodimethylamine as described in the known literature requires that following the completion of reaction with sodium nitrite, the entire aqueous solution be distilled. In some cases this distillate is acidified and redistilled; in other cases more water is added to the dry residue left after the distillation, and this is distilled over into the first distillate. Finally, potassium carbonate is added to the distillate, which causes the separation of the nitroso compound as a separate upper liquid layer.

Among the objects of the present invention is the production of unsymmetrical dimethylhydrazine by simplified processes giving high yields.

Other objects include the elimination of procedures heretofore required in prior art processes.

Still further objects and advantages of the present invention will appear from the more detailed description set forth below, it being understood that such more detailed description is given by way of illustration and explanation only and not by way of limitation since various changes therein may be made by those skilled in the art without departing from the scope and spirit of the present invention.

In accordance with the present invention, simplified procedures have been developed and new operations utilized both in the conversion of the intermediate N-nitrosodimethylamine to unsymmetrical dimethylhydrazine but also in the preparation of the nitroso derivative for the reduction step. The present invention may utilize the nitroso derivative obtained from any desired source, but since certain novel procedures have been developed in the pre-treatment or separation of the N-nitroso dimethylamine, such procedures are included in the present invention.

It has been found in accordance with this invention that great advances are made by carrying out the reduction of N-nitroso dimethylamine in an aqueous medium by an amphoteric metal in the presence of an alkaline agent reactive with said metal. In addition it has been found that the initial recovery of the N-nitroso dimethylamine from the reaction medium in which it is made by conventional methods may be expedited and simplified. And while if desired, the introso derivative may be separated from the reaction medium before reduction to the hydrazine derivative, it may be subjected directly to the alkaline reduction step of the present invention without first separating the nitroso derivative.

Thus after the reaction with sodium nitrite is complete, a small amount of sodium hydroxide or other alkali is dissolved in the solution which has been cooled to ambient temperature. As a result, the nitroso compound separates out immediately as a separate layer on top. It has been found that this product can be introduced directly into the next step, reduction, without further treatment.

It has been found possible to perform this reduction in such manner that smaller quantities of reducing agent are required, no acid is used, and because of the amphoteric nature of the metals employed in this reduction it is possible to perform the reduction in an alkaline solution by employing only a very small fraction of the alkali theoretically required to react with the metal. This process therefore results in four distinct advantages:

1. It eliminates the very costly acetic acid.
2. It eliminates the use of excessively large quantities of any other acid or alkali.
3. It permits the distillation of the finally desired product directly from the solution without a prior neutralization treatment as would be required if acid were used in the reduction.
4. An important additional advantage resides in the fact that the process of this invention reduces the total volume of liquid employed in the reaction by a very large degree.

The metals which can be desirably employed for the reduction are aluminum and zinc. They may be generally referred to as an amphoteric metal having an atomic weight between 27 and 66 from the second and third groups of the periodic system. Because of the lower cost per equivalent, aluminum is preferred. However, either of these metals may be used in the process. This process may be carried out using an amount of sodium hydroxide stoichiometrically equivalent to or greater than the amount of aluminum or zinc employed, or it may be performed with only a small fraction of the theoretically required alkali, in order to reduce the costs of raw materials required. While it is believed that either aluminum or zinc reacts in an alkaline solution to generate hydrogen in an active form, which becomes absorbed by a reducible substance if present, no limitation by way of theory is intended here or in the following. Furthermore, if only a small fraction of the theoretically required alkali is present, the reaction will proceed to completion. It is believed that this occurs through the continuous precipitation of the metal hydroxide, which thereby releases the alkali for further reaction with fresh metal. Therefore, the alkali, when used in less than equivalent quantities, may be looked upon as serving primarily the purpose of a catalyst, since it is continually regenerated.

It has also been found that when less than equivalent quantities of alkali are used, a lag appears shortly after the reaction has become initiated, owing apparently to the fact that after the small quantity of alkali has gone into the reaction, a time interval elapses before the hydroxides of the metals begin to precipitate out and thereby regenerate the alkali. This lag, however, may be eliminated by the prior addition of a small amount of unsymmetrical dimethylhydrazine. By using this material as an initiating agent, the lag is eliminated and the reaction proceeds from start to finish.

It has been found possible to employ efficiently in this reaction zinc or aluminum of any particle size from the finest powder (325 mesh or finer) to coarse material as 0.25 to 0.5 inch pellets. The size of particle is not critical and is of chief importance in determining the rate of reaction. The larger particle sizes have the advantage in being less expensive.

The degree of alkalinity may vary and for example may desirably be from 0.01 mole of caustic per mole of N-nitrosodimethylamine to 2 or more moles of caustic per mole of the nitroso compound. As has been shown, less than equivalent amounts of alkali, as well as equivalent or higher amounts of alkali may be used. Greater than equivalent quantities of alkali may also be used. When equivalent amounts of alkali are used, it is not necessary to prime the reaction with unsymmetrical dimethylhydrazine in order to prevent an initial reaction lag. When less than equivalent amounts of alkali are used an initial lag occurs which can be avoided by prior addition of for example 0.5 ml. to 5.0 ml. of uns-dimethylhydrazine per mole of nitroso compound. However, the reaction may be performed successfully without this priming. If the prior addition of the uns-dimethylhydrazine is omitted, a lag of 0.5 to 0.75 hour occurs shortly after the start of the reaction, but after that period of time it accelerates again to a normal rate.

This reaction may also be performed in the presence of an inert organic solvent, such as a hydrocarbon such as benzene, toluene, methanol, ethanol, or other alcohols, glycol, diethylether, and any other non-reactive solvent. In this case the nitroso compound is desirably dissolved in the solvent and placed in the reaction flask. All the metal to be used in the reaction may if desired then be introduced at once. A solution of caustic in water is then added with stirring of the reaction mixture. Most of the final product appears in the aqueous phase when an immiscible aqueous phase forms as with hydrocarbons or ethers. If insufficient water has been used to form an aqueous layer, a small amount of water is all that is required to extract the product from the organic layer.

The quantity of water used in the reaction may vary and for example, may be from 10 mls. to 800 mls. or more per mole of nitroso compound subjected to the reduction reaction. Optimum yields are obtained when the amount of water is in the range of 200 mls. to 600 mls. Larger amounts of water do not decrease the yield but they reduce the concentration of product in the final liquor, thereby making it harder to isolate the pure product.

The amount of metal used may vary and for example may be from 1.33 gm. atoms of Al or 2 gm. atoms of zinc to 4 gm. atoms of Al or 8 gms. atoms of zinc per mole of nitroso compound. An optimum yield is obtained when 1.8 to 3.0 gm. atoms of aluminum or 4 to 8 gms. atoms of zinc are used per gram-mole of nitroso compound.

Many alkaline reagents may be used in this reaction: sodium hydroxide, sodium carbonate and other alkali and alkaline earth hydroxides and oxides, and alkali metal carbonates.

The separation of nitroso dimethylamine when desired, may be accomplished by using either alkali hydroxides or alkali carbonates as well as various salts, the use of either alkali hydroxides or carbonates being preferred. The concentrations will vary with the amount of the salt which may already be in the aqueous solution but in general, the concentrations to effect separation should be in a range from 6 to 20% or more by weight of the water content.

Alkali hydroxides and carbonates may be used both for separation and reduction. The same alkali which was used for the separation step may subsequently be used for the reduction step, but not so desirably because of all of the associated salts. Actually, if such a procedure is to be employed, it would be best where a reduction is performed without prior separation of the nitroso derivative.

The processes herein set forth, may also be performed without requiring the presence of an alkaline reagent, by first amalgamating the metal for this purpose, the aluminum or zinc may be covered for 1 to 20 seconds with an approximately 1% solution of mercuric chloride, the aqueous solution then decanted or filtered off. Finally the metal is washed a few times with water. The reduction of the nitroso compound may then be performed by reacting the metal with nitroso compound in the presence of water. The most convenient method is to dissolve the nitroso compound in an organic solvent, such as a hydrocarbon, an alcohol, ether, amine, or other non-reactive solvent; then add all the metal followed by gradual addition of water. However it should be noted that the process utilizing the amalgamated metal may also be carried out in the presence of alkali as given above when unamalgamated metal is employed.

These reactions may be performed at any temperature from about 15° C. to the boiling point of the solution. The higher temperatures favor increased rates of reaction and are therefore preferred.

The following examples illustrate the invention, parts being by weight unless otherwise indicated.

*Example 1*

The N-nitroso dimethylamine was prepared as follows: 81.5 gm. of dimethylamine hydrochloride were dissolved in 40 ml. of water. To this solution were added 2 ml. of concentrated hydrochloric acid. To this solution, which was heated to 75° C. by an external bath, a slurry of 78 gm. of sodium nitrite in 50 ml. of water was added, while the reaction mixture was stirred. The hydrogen ion concentration of the reaction mixture was maintained at a pH of 5 to 5.5 during the course of the reaction by occasional small additions of dilute hydrochloric acid. The mixture was stirred and maintained at 75° C. for two hours after all the sodium nitrite had been added.

The solution was now cooled to ambient temperature, and 13.3 gm. of sodium hydroxide were dissolved in the solution, and as a result the nitroso dimethylamine separated out on top as a yellow, clear liquid layer. 71 gm. of nitroso compound were obtained, corresponding to a 95.5% yield.

74 gm. of nitroso dimethylamine were dissolved in 250 ml. of water, together with 7 gm. of sodium hydroxide. To this solution were also added 5 ml. of unsymmetrical dimethyl hydrazine. Eighty gm. of aluminum powder were added gradually to this solution, with continuous stirring, and with the temperature ranging between 55 and 65° C. Cooling with an ice bath was required to permit rapid addition of the aluminum. At the end of the reaction, the mixture was stirred for another hour, while the temperature was maintained at 60° C. by external heating. Finally, the product was filtered, and the filtrate was distilled through a fractionating column to separate out the unsymmetrical dimethylhydrazine. The total yield of product, including washings from the precipitate, amounted to 76.8% yield. Under production conditions, the precipitate is washed with just enough water for the next batch, and this solution contains enough unsymmetrical dimethylhydrazine to act as a primer for the succeeding reaction, at the same time allowing a complete recovery of all the unsymmetrical dimethylhydrazine.

*Example 2*

The N-nitrosodimethylamine was prepared as follows: 45 gms. of dimethylamine were added with stirring and cooling to a solution containing 49 gms. of sulfuric acid and 40 mls. of water. The solution was brought to 75° C. and a slurry of 78 gms. of sodium nitrite in 50 mls. of water was added while the reaction mixture was stirred. The mixture was stirred and maintained at 75° C. for one hour after all the sodium nitrite has been added. The nitroso compound was separated out by the addition of sodium hydroxide as described in Example 1. The N-nitrosodimethylamine obtained from this reaction was dissolved in 300 mls. of water. The solution was stirred and heated to 60° C. Then 52 gms. of granular aluminum (5 mesh and finer) were added in small portions over a period of 2 hours, simultaneously with the addition of 80 gms. of sodium hydroxide dissolved in 80 ml. of water at a corresponding rate. The addition of aluminum and sodium hydroxide served to maintain the reaction temperature at 60° C. to 65° C. without external heating. After the addition of the aluminum and sodium hydroxide, the mixture was stirred and heated at 60° C. for two more hours. The solution was filtered and the pure unsymmetrical dimethylhydrazine obtained by fractional distillation. The over-all yield, based on the dimethylamine employed, was 74%.

*Example 3*

To a solution containing 18.5 gms. N-nitrosodimethylamine and 6 gms. of sodium hydroxide in 62.5 mls. of water, 26 gms. of zinc dust were added in small portions over a period of one hour, temperature being maintained between 50°–60° C. The mixture was stirred and heated for one hour after addition of zinc was finished. The final reaction mixture was found to contain a 16.1% yield of unsymmetrical dimethylhydrazine.

*Example 4*

Into a glass column were packed 43.5 gms. of aluminum granules (0.25–0.5 inch in size). A solution containing 11.9 gms. of N-nitrosodimethylamine and 3.3 gms. of sodium hydroxide in 55 mls. of water was allowed to enter the top of the column drop-wise at the rate of one drop in 5 seconds. Examination of the solution after three passes through the column showed a 41.5% yield of unsymmetrical dimethylhydrazine.

*Example 5*

This example performed as in Example 4, except that 60–70 mesh aluminum was used, showed a yield of 71% of unsymmetrical dimethylhydrazine.

*Example 6*

Fifty-two gms. of granular aluminum (5 mesh or finer) were just covered with a 10% solution of mercuric chloride for about 10 seconds. The aqueous solution was removed. The aluminum was washed several times with water. This aluminum was then added to a solution containing 74 gms. of N-nitrosodimethylamine in 100 mls. of toluene. Over a period of two hours 200 mls. of water were added while the temperature was maintained at 40–50° C. The final mixture was found to contain 63% yield of unsymmetrical dimethylhydrazine.

*Example 7*

A process performed just as in Example 6, except that 260 gms. of zinc dust were used instead of the aluminum. A 48% yield of unsymmetrical dimethylhydrazine was obtained.

*Example 8*

Seventy-four gms. of N-nitrosodimethylamine were dissolved in 100 mls. of benzene. Fifty-two gms. powdered aluminum (325 mesh or finer) were added. Then 150 ml. of water containing 80 gms. of sodium hydroxide were added over a period of three hours. The final mixture was found to contain a 67% yield of unsymmetrical dimethylhydrazine.

In order to make possible a comparison of the prior art with the present invention, the following summary is given of the reduction procedure as described in "Organic Synthesis," Collective Volume II, p. 212. It is to be noted that this was heretofore the preferred laboratory method for preparing this compound.

In this procedure, 10 gm. atoms of zinc dust are reacted with 2.7 moles of nitroso dimethylamine and 14 moles of acetic acid. The total volume of material used is approximately 4500 ml. The subsequent isolation of product is complicated and costly, requiring the addition of 1000 gm. of sodium hydroxide and the steam distillation of 5–6 liters of distillate. The latter is then treated with 650 ml. of concentrated hydrochloric acid, and most of this large bulk of liquid evaporated off. Subsequent treatments with alcohol and evaporation are required to obtain 77 to 83% of the theoretical of a crude hydrochloride, which upon recrystallization gives 69–73% of the theoretical of pure hydrochloride salt.

On the other hand, a typical reaction using the present process for the same number of moles of nitroso compound, that is, 2.7 moles, requires a total volume of only 1400 mls., 5.2 gm. atoms of aluminum powder, and 252 gms. of sodium hydroxide. When the reaction is finished, it is merely filtered and the pure unsymmetrical dimethylhydrazine can be isolated by directly fractionating it through a column. The yields of pure product range between 80–90% of the theoretical, based on the nitroso dimethylamine.

I claim:

1. A method of manufacture of unsymmetrical dimethyl hydrazine which comprises reducing N-nitrosodimethylamine in an aqueous medium by an amphoteric metal selected from the group consisting of aluminum and zinc in the presence of an inorganic alkaline agent reactive with said metal.

2. The method of claim 1 in which the amount of alkaline agent is less than the stoichiometric equivalent of the metal.

3. The method of claim 2 in which the reaction is primed by the addition of unsymmetrical dimethylhydrazine.

4. The method of claim 3 in which the metal is amalgamated.

5. The method of claim 4 in which the reduction medium is heated directly to distill out unsymmetrical dimethylhydrazine.

6. The method of manufacturing unsymmetrical dimethylhydrazine which comprises reducing N-nitroso dimethylamine in an aqueous medium with aluminum in the presence of caustic alkali.

7. The method of claim 6 in which the mole ratios of caustic to nitroso compound are from 0.01:1 to 2:1.

8. The method of claim 6 in which the caustic is less than the stoichiometric equivalent.

9. The method of claim 8 in which the reaction is primed by the addition of unsymmetrical dimethylhydrazine.

10. The method of claim 6 in which the aluminum is amalgamated.

11. The method of manufacturing unsymmetrical dimethylhydrazine which comprises reducing N-nitroso dimethylamine in a non-acid aqueous medium with amalgamated aluminum.

12. The method of manufacturing unsymmetrical dimethylhydrazine which comprises reducing N-nitroso dimethylamine in an aqueous medium with zinc in the presence of caustic alkali.

13. The method of claim 12 in which the mole ratios of caustic to nitroso compound are from 0.1:1 to 2:1.

14. The method of claim 12 in which the caustic is less than the stoichiometric equivalent.

15. The method of claim 14 in which the reaction is primed by the addition of unsymmetrical dimethylhydrazine.

16. The method of manufacturing unsymmetrical dimethylhydrazine which comprises reducing N-nitroso dimethylamine in a non-acid aqueous medium with amalgamated zinc.

17. The method of claim 12 in which the zinc is amalgamated.

18. The method of claim 1 carried out in the presence of an inert organic solvent.

19. The method of claim 6 carried out in the presence of an inert organic solvent.

20. The method of claim 11 carried out in the presence of an inert organic solvent.

References Cited in the file of this patent

Hatt: "Chem. Abst." (1936), vol. 30, p. 3779.
Blatt: "Org. Synthesis," Collective, vol. II, p. 212.
Renouf: "Berichte" (July-December 1880), vol. 13, No. II, pp. 2171–4.